United States Patent
Hughes et al.

(10) Patent No.: US 6,757,793 B1
(45) Date of Patent: Jun. 29, 2004

(54) REDUCING PROBE TRAFFIC IN MULTIPROCESSOR SYSTEMS USING A VICTIM RECORD TABLE

(75) Inventors: William A. Hughes, Burlingame, CA (US); Yinong A. Zhang, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/539,198

(22) Filed: Mar. 29, 2000

(51) Int. Cl.[7] .................. G06F 12/08; G06F 15/167
(52) U.S. Cl. ............... 711/156; 711/155; 711/141; 711/145; 709/213; 709/214
(58) Field of Search ................... 711/121, 133, 711/136, 137, 141, 145, 1, 156, 155; 709/213, 214, 215

(56) References Cited

U.S. PATENT DOCUMENTS

| | | | |
|---|---|---|---|
| 5,303,362 A | | 4/1994 | Butts, Jr. et al. ............ 711/121 |
| 5,673,413 A | | 9/1997 | Deshpande et al. .......... 711/141 |
| 5,749,095 A | | 5/1998 | Hagersten .................... 711/141 |
| 6,061,765 A | * | 5/2000 | Van Doren et al. .......... 711/145 |
| 6,085,292 A | * | 7/2000 | McCormack et al. ........ 711/140 |
| 6,101,420 A | | 8/2000 | VanDoren et al. ............. 700/5 |
| 6,101,581 A | * | 8/2000 | Doren et al. ................. 711/141 |
| 6,105,108 A | * | 8/2000 | Steely et al. ................. 711/118 |
| 6,202,126 B1 | * | 3/2001 | Van Doren et al. .......... 711/118 |
| 6,295,583 B1 | * | 9/2001 | Razdan et al. ............... 711/137 |
| 6,529,999 B1 | * | 3/2003 | Keller et al. ................. 711/141 |
| 6,631,401 B1 | * | 10/2003 | Keller et al. ................. 711/146 |

FOREIGN PATENT DOCUMENTS

EP      0 379 771      8/1990

OTHER PUBLICATIONS

Lenoski, "The Design and Analysis of Dash: A Scalable Directory-Based Multiprocessor," Dec. 1991, pp. 1–176.

* cited by examiner

*Primary Examiner*—Pierre Bataille
(74) *Attorney, Agent, or Firm*—Meyertons Hood Kivlin Kowert & Goetzel, P.C.; B. Noël Kivlin

(57) ABSTRACT

A victim record table records victim blocks which have been returned from a cache to memory and which are not currently cached in any other caches. If a command affecting a block recorded in the victim record table is received, one or more probes corresponding to the command may be inhibited even if probes would ordinarily be transmitted for the command. System bandwidth which would be consumed by the probes may be conserved. Furthermore, since probes are inhibited, the latency of the command may be reduced since the command may be completed without waiting for any probe responses. Since probes are selectively inhibited if an affected block is recorded in the victim record table, the size of the victim record table may be flexible. If a particular block is not represented in the victim record table, probes are performed when the particular block is accessed (even if the particular block could have been represented in the victim record table but is not because of a limited number of records). Thus, coherency is maintained even if every uncached block is not represented in the victim record table.

14 Claims, 11 Drawing Sheets

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit [1:0] | | CMD[5:0] | | | | | |
| 2 | DestNode[2:0] | | | DestUnit [1:0] | | SrcNode[2:0] | | |
| 3 | | | | SrcTag[4:0] | | | | |
| 4 | | | | | | | | |

Fig. 5

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

Fig. 6

| CMD Code | Command | Packet Type |
|---|---|---|
| 000000 | Nop | Info |
| 000001 | VicBlk | Command/Data |
| 000010 | Reserved | |
| 000011 | ValidateBlk | Command |
| 000100 | RdBlk | Command |
| 000101 | RdBlkS | Command |
| 000110 | RdBlkMod | Command |
| 000111 | ChangetoDirty | Command |
| x01xxx | WrSized | Command/Data |
| 01xxxx | ReadSized | Command |
| 100xxx | Reserved | |
| 110000 | RdResponse | Response/Data |
| 110001 | ProbeResp | Response |
| 110010 | TgtStart | Response |
| 110011 | TgtDone | Response |
| 110100 | SrcDone | Response |
| 110101 | MemCancel | Response |
| 11011x | Reserved | |
| 11100x | Probe | Command |
| 11101x | Broadcast | Command |
| 11110x | Reserved | |
| 111110 | Reserved | |
| 111111 | Sync | Info |

| V | Page Address | B0V | B1V | B2V | B3V | ... | B63V |
|---|---|---|---|---|---|---|---|

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | Sh | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | Count[1:0] | | Err | SrcTag[4:0] | | | | |
| 4 | Sh | P | NP | | | Cncl | Count[3:2] | |

REDUCING PROBE TRAFFIC IN MULTIPROCESSOR SYSTEMS USING A VICTIM RECORD TABLE

BACKGROUND OF THE INVENTION

1. Field of the Invention

This invention is related to computer systems and, more particularly, to coherency mechanisms within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various coherency protocols are used. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Many coherency protocols include the use of probes to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor) to read or write the block. Each probe receiver responds to the probe, and once the probe responses are received the command may proceed to completion. The coherency point is the component responsible for maintaining coherency, e.g. a memory controller for the memory system.

Unfortunately, probes increase the bandwidth demands on the computer system and may increase the latency of the commands. Bandwidth demands are increased because the probes are transmitted through the interconnect of the computer system. Latency may increase because the probe responses are needed to verify that the data to be provided in response to the command is the correct copy of the block (i.e. that no cache stores an updated copy of the block). Accordingly, it is desirable to reduce the probe traffic in a computer system while still maintaining coherency.

SUMMARY OF THE INVENTION

The problems outlined above are in large part solved by a victim record table as described herein. The victim record table records victim blocks which have been returned from a cache to memory and which are not currently cached in any other caches. If a command affecting a block recorded in the victim record table is received, one or more probes corresponding to the command may be inhibited even if probes would ordinarily be transmitted for the command. Advantageously, system bandwidth which would be consumed by the probes may be conserved. Furthermore, since probes are inhibited, the latency of the command may be reduced since the command may be completed without waiting for any probe responses.

Since probes are selectively inhibited if an affected block is recorded in the victim record table, the size of the victim record table may be flexible. If a particular block is not represented in the victim record table, probes are performed when the particular block is accessed (even if the particular block could have been represented in the victim record table but is not because of a limited number of records). Thus, coherency is maintained even if every uncached block is not represented in the victim record table. Accordingly, the victim record table may be sized according to cost versus performance tradeoffs (and not according to concerns about correctly maintaining coherency).

Broadly speaking, an apparatus is contemplated, comprising a table and a control circuit. The table is configured to store a plurality of records, wherein a first record of the plurality of records is configured to identify a first block previously received as a victim block by a memory controller. Coupled to the table, the control circuit is configured to inhibit issuance of one or more probes for a first read command responsive to the first read command accessing the first block.

Additionally, a computer system is contemplated comprising a memory, a memory controller coupled to the memory, and a source coupled to the memory controller. The memory controller includes a table configured to store a plurality of records, wherein a first record of the plurality of records is configured to identify a first block previously received by the memory controller as a victim block. The source is configured to transmit a first read command to the memory controller. The memory controller is configured to inhibit issuance of one or more probes for the first read command responsive to the first read command accessing the first block.

Still further, a method is contemplated. A table having a plurality of records is maintained, wherein each record of the plurality of records is configured to identify a respective block previously received by a memory controller as a victim block. One or more probes are selectively issued for a first read command responsive to whether or not a first block accessed by the first read command is identified by a first record of the plurality of records.

BRIEF DESCRIPTION OF THE DRAWINGS

Other objects and advantages of the invention will become apparent upon reading the following detailed description and upon reference to the accompanying drawings in which:

FIG. 3 is a block diagram of one embodiment of an information packet.

FIG. 4 is a block diagram of one embodiment of a command packet.

FIG. 5 is a block diagram of one embodiment of a response packet.

FIG. 6 is a block diagram of one embodiment of a data packet.

FIG. 7 is a table illustrating one embodiment of packet definitions.

FIG. 14 is a block diagram of one embodiment of an entry in a victim record table shown in FIG. 9.

FIG. 15 is a block diagram of one embodiment of a SrcDone packet.

FIG. 16 is a block diagram of one embodiment of a RdResponse packet.

Figure 1:
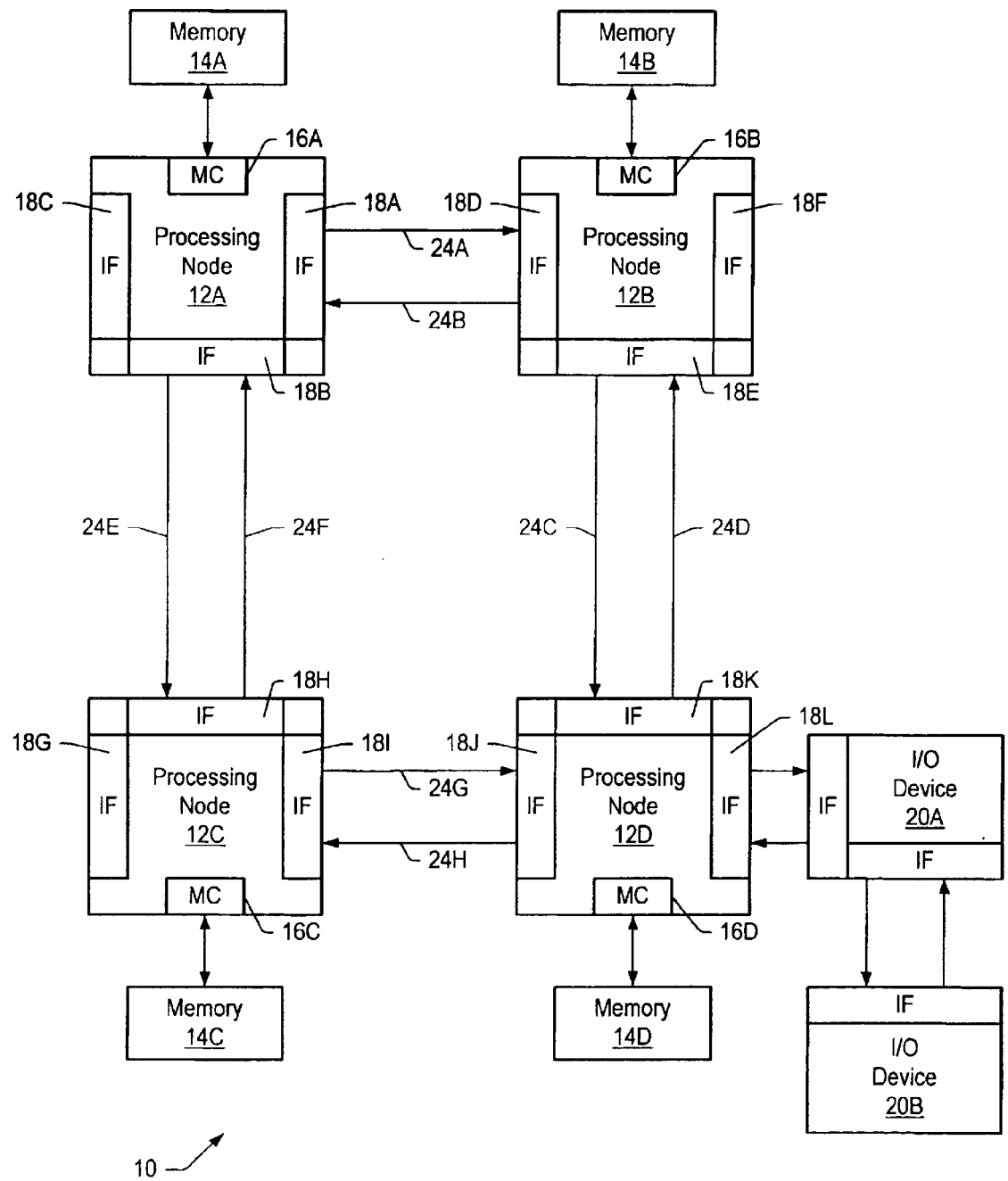
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, one embodiment of a computer system 10 is shown. Other embodiments are possible and contemplated. In the embodiment of FIG. 1, computer system 10 includes several processing nodes 12A, 1213, 12C, and 12D. Each processing node is coupled to a respective memory 14A–14D via a memory controller 16A–16D included within each respective processing node 12A–12D. Additionally, processing nodes 12A–12D include interface logic used to communicate between the processing nodes 12A–12D. For example, processing node 12A includes interface logic 18A for commnunicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic .18J, 18K, and 18L. Processing node 12D is coupled to communicate with an input/output (I/O) device 20A via interface logic 18L, and I/O device 20A is further coupled to a second I/O device 20B. Other processing nodes may communicate with other I/O devices in a similar fashion. Alternatively, a processing node may communicate with an I/O bridge which is coupled to an I/O bus.

Processing nodes 12A–12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes or in a noncoherent fashion as a daisy-chain structure between I/O devices 20A–20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

Processing nodes 12A–12D, in addition to a memory controller and interface logic, may include one or more processors. Broadly speaking, a processing node comprises at least one processor and may optionally include a memory controller for communicating with a memory and other logic as desired. As used herein, a "node" is a device which is capable of participating in transactions upon the interconnect.

Memories 14A–14D may comprise any suitable memory devices. For example, a memory 14A–14D may comprise one or more RAMBUS DRAMs (RDRAMs), synchronous DRAMs (SDRAMs), DRAM, static RAM, etc. The address space of computer system 10 is divided among memories 14A–14D. Each processing node 12A–2D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. Memory controllers 16A–16D may comprise control circuitry for interfacing to memories 14A–14D. Additionally, memory controllers 16A–16D may include request queues for queuing memory requests.

Generally, interface logic 18A–18L may comprise buffers for receiving packets from the link and for buffering packets to be transmitted upon the link. Computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 20A–20B are illustrative of any desired peripheral devices. For example, I/O devices 20A–20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Figure 2:
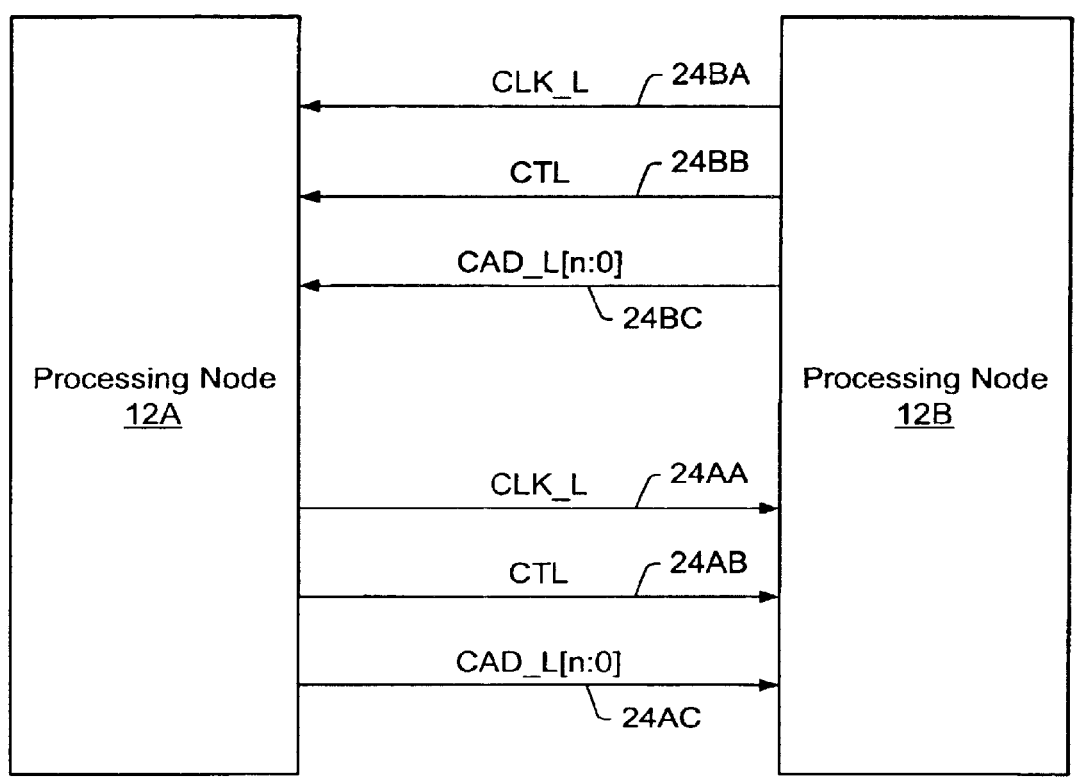
FIG. 2 is a block diagram of one embodiment of a pair of nodes shown in FIG. 1, highlighting one embodiment of interconnection therebetween.

Turning next to FIG. 2, a block diagram illustrating processing nodes 12A and 12B is shown to illustrate one embodiment of the links therebetween in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line indicates whether or not the data transmitted upon the control/address/data bus is either a bit time of a control packet or a bit time of a data packet. The control line is asserted to indicate a bit time of a control packet, and deasserted to indicate a bit time of a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following. Additionally, in one embodiment, the control line may be deasserted during transmission of a control packet to indicate stall bit times. A subsequent reassertion of the control line may indicate that the control packet is continuing.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIGS. 3–6, exemplary packets employed in one embodiment of system 10 are shown. FIGS. 3–5 illustrate control packets and FIG. 6 illustrates a data packet. Other embodiments may employ different packet definitions, as desired. Each of the packets are illustrated as a series of bit times enumerated under the "bit time" heading. The bit times of the packet are transmitted according to the bit time order listed. FIGS. 3–6 illustrate packets for an eight bit control/address/data bus implementation. Accordingly, each bit time comprises eight bits numbered seven through zero. Bits for which no value is provided in the figures may either be reserved for a given packet, or may be used to transmit packet-specific information. Fields indicated by dotted lines indicate optional fields which may not be included in all of the packets of a certain type.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet.

FIG. 3 illustrates an information packet (info packet) 30. Info packet 30 comprises four bit times on an eight bit link. The command encoding is transmitted during bit time one, and comprises six bits in the present embodiment. Each of the other control packets shown in FIGS. 4 and 5 include the command encoding in the same bit positions during bit time 1. Info packet 30 may be used to transmit messages between processing nodes when the messages do not include a memory address. Additionally, info packets may be used to transmit buffer free counts using the coupon-based flow control scheme.

FIG. 4 illustrates a command packet 32. Command packet 32 comprises eight bit times on an eight bit link. The command encoding is transmitted during bit time 1. A source unit number is transmitted during bit time 1 as well, and a source node number is transmitted during bit time two. A node number unambiguously identifies one of the processing nodes 12A–12D within computer system 10, and is used to route the packet through computer system 10. The unit number identifies a unit within the node which sourced the transaction (source unit number) or which is the destination of the transaction (destination unit number). Units may include memory controllers, caches, processors, etc. Optionally, command packet 32 may include either a destination node number and destination unit in bit time 2 (or a target node number and target unit, for some other packets). If the destination node number is included, it is used to route the packet to the destination node. Also, many command packets may include a source tag in bit time 3 which, together with the source node and source unit, may link the packet to a particular transaction of which it is a part. Bit times five through eight are used transmit the most significant bits of the memory address affected by the transaction. Command packet 32 may be used to initiate a transaction (e.g. a read or write transaction), as well as to transmit commands in the process of carrying out the transaction for those commands which carry the memory address affected by the transaction. Generally, a command packet indicates an operation to be performed by the destination node.

Some of the undefined fields in packet 32 may be used in various command packets to carry packet-specific information. Furthermore, bit time 4 may be used in some commands to transmit the least significant bits of the memory address affected by the transaction.

FIG. 5 illustrates a response packet 34. Response packet 34 includes the command encoding and a destination node number and destination unit number. The destination node number identifies the destination node for the response packet (which may, in some cases, be the source node or target node of the transaction). The destination unit number identifies the destination unit within the destination node. Various types of response packets may include additional information. For example, a read response packet may indicate the amount of read data provided in a following data packet. Probe responses may indicate whether or not a copy of the requested block is being retained by the probed node. Generally, response packet 34 is used for commands during the carrying out of a transaction which do not require transmission of the memory address affected by the transaction. Furthermore, response packet 34 may be used to transmit positive acknowledgement packets to terminate a transaction. Similar to the command packet 32, response packet 34 may include the source node number, the source unit number, and the source tag for many types of responses (illustrated as optional fields in FIG. 5).

FIG. 6 illustrates the data packet 36. Data packet 36 includes eight bit times on an eight bit link in the embodiment of FIG. 6. Data packet 36 may comprise different numbers of bit times dependent upon the amount of data being transferred. For example, in one embodiment a block comprises 64 bytes and hence 64 bit times on an eight bit link. Other embodiments may define a block to be of a different size, as desired. Additionally, data may be transmitted in less than block sizes for non-cacheable reads and writes. Data packets for transmitting data less than block size employ fewer bit times. In one embodiment, non-block sized data packets may transmit several bit times of byte enables prior to transmitting the data to indicate which data bytes are valid within the data packet. Furthermore, block data may be returned with the quadword addressed by the least significant bit of the request address first, followed by interleaved return of the remaining quadwords. A quadword may comprise 8 bytes, in one embodiment.

FIGS. 3–6 illustrate packets for an eight bit link. Packets for 16 and 32 bit links may be formed by concatenating consecutive bit times illustrated in FIGS. 3–6. For example, bit time one of a packet on a 16 bit link may comprise the information transmitted during bit times one and two on the eight bit link. Similarly, bit time one of the packet on a 32 bit link may comprise the information transmitted during bit times one through four on the eight bit link. Formulas 1 and 2 below illustrate the formation of bit time one of a 16 bit link and bit time one of a 32 bit link according to bit times from an eight bit link.

$$BT1_{16}[15:0]=BT2_8[7:0]\|BT1_8[7:0] \quad (1)$$

$$BT1_{32}[31:0]=BT4_8[7:0]\|BT3_8[7:0]\|BT2_8[7:0]\|BT1_8[7:0] \quad (2)$$

Turning now to FIG. 7, a table 38 is shown illustrating packets employed according to one exemplary embodiment of the coherent link within computer system 10. Other embodiments are possible and contemplated, including any other suitable set of packets and command field encodings. Table 38 includes a command code column illustrating the command encodings assigned to each command, a command column naming the command, and a packet type column indicating which of command packets 30–34 (and data packet 36, where specified) is employed for that command.

A read transaction is initiated using one of the ReadSized, RdBlk, RdBlkS or RdBlkMod commands. The ReadSized command is used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. The RdBlkS command may be used to make certain types of coherency schemes (e.g. directory-based coherency schemes) more efficient. In general, the appropriate read command is transmitted from the source initiating the transaction to a target node which owns the memory corresponding to the block. The target node transmits Probe commands (indicating return of probe responses to the source of the transactions) to the other nodes in the system to maintain coherency by changing the state of the block in those nodes and by causing a node including an updated copy of the block to send the block to the source node. Each node receiving a Probe command transmits a ProbeResp response packet to the source node. If a probed node has an updated copy of the read data (i.e. dirty data), that node transmits a RdResponse response packet and the dirty data. A node transmitting dirty data may also transmit a MemCancel response packet to the target node in an attempt to cancel transmission by the target node of the requested read data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction.

A write transaction is initiated using a WrSized or VicBlk command followed by a corresponding data packet. The WrSized command is used for non-cacheable writes or writes of data other than a block in size. To maintain coherency for WrSized commands, the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block. No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e:g., the broadcast command may be used to distribute interrupts). Finally, the sync info packet may be used for cases in which synchronization of the fabric is desired (e.g. error detection, reset, initialization, etc.).

Processing Node

Figure 8:
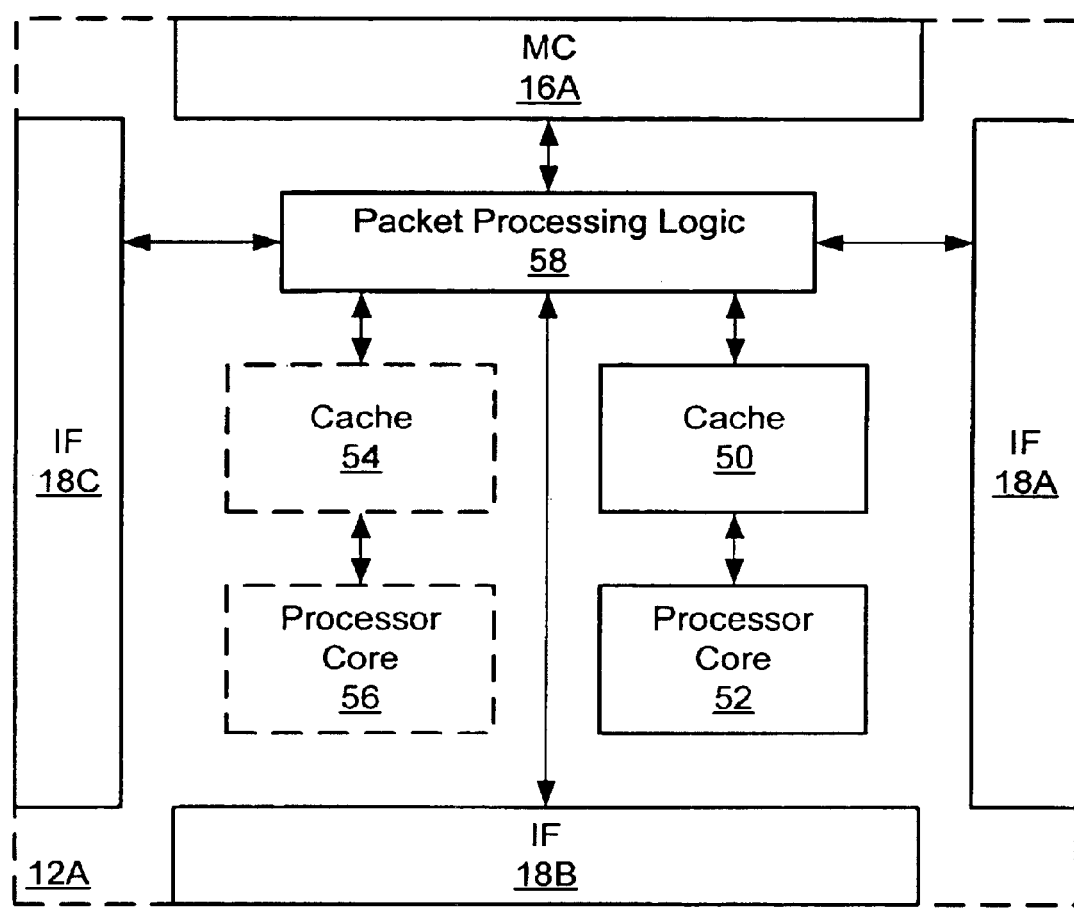
FIG. 8 is a block diagram of one embodiment of a processing node.

Turning now to FIG. 8, a block diagram of one embodiment of an exemplary processing node 12A is shown. Other processing nodes 12B–12D may be configured similarly. Other embodiments are possible and contemplated. In the embodiment of FIG. 8, processing node 12A includes interface logic 18A, 18B, and 18C and memory controller 16A. Additionally, processing node 12A includes a processor core 52 and a cache 50, packet processing logic 58, and may optionally include a second processor core 56 and a second cache 54. Interface logic 18A–18C are coupled to packet processing logic 58. Processor cores 52 and 56 are coupled to caches 50 and 54, respectively. Caches 50 and 54 are coupled to packet processing logic 58. Packet processing logic 58 is coupled to memory controller 16A.

Generally, packet processing logic 58 is configured to respond to control packets received on the links to which processing node 12A is coupled, to generate control packets in response to caches 50 and 54 and/or processor cores 52 and 56, to generate probe commands and response packets in response to transactions selected by memory controller 16A for service, and to route packets for which node 12A is an intermediate node to another of interface logic 18A–18C for transmission to another node. Interface logic 18A, 18B, and 18C may include logic to receive packets and synchronize the packets to the internal clock used by packet processing logic 58.

Caches 50 and 54 comprise high speed cache memories configured to store blocks of data. Caches 50 and 54 may be integrated within respective processor cores 52 and 56. Alternatively, caches 50 and 54 may be coupled to processor cores 52 and 56 in a backside cache configuration or an in-line configuration, as desired. Still further, caches 50 and 54 may be implemented as a hierarchy of caches. Caches which are nearer processor cores 52 and 56 (within the hierarchy) may be integrated into processor cores 52 and 56, if desired.

Processor cores 52 and 56 include the circuitry for executing instructions according to a predefined instruction set. For example, the x86 instruction set architecture may be selected. Alternatively, the Alpha, PowerPC, or any other instruction set architecture may be selected. Generally, the processor cores access the caches for data and instructions. If a cache miss is detected, a read request is generated and transmitted to the memory controller within the node to which the missing block is mapped.

Memory Controller

Figure 9:
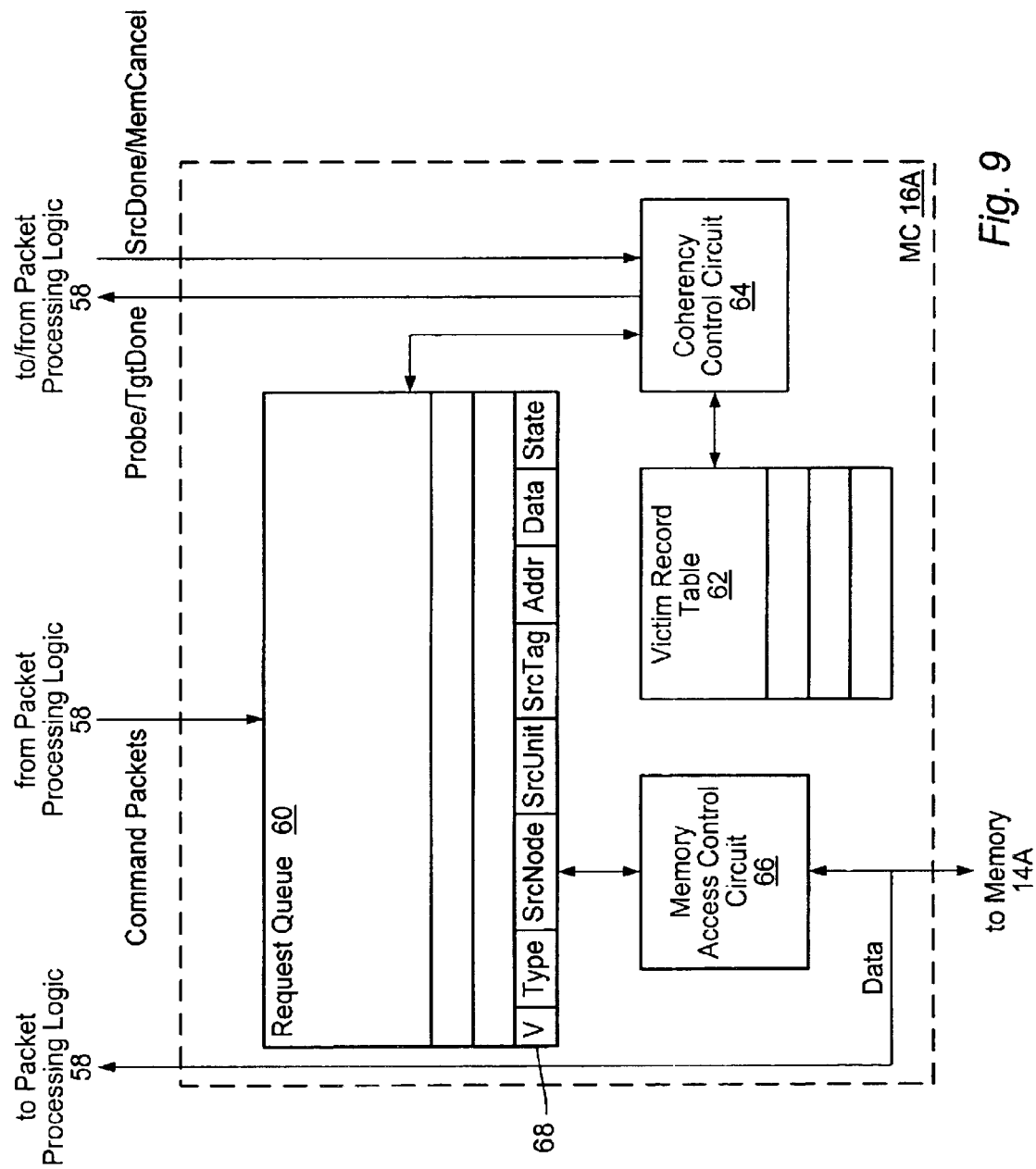
FIG. 9 is a block diagram of one embodiment of a memory controller.

Turning next to FIG. 9, a block diagram of one embodiment of memory controller 16A is shown. Other memory controllers 16B–16D may be configured similarly. Other embodiments are possible and contemplated. In the embodiment of FIG. 9, memory controller 16A includes a request queue 60, a victim record table 62, a coherency control circuit 64, and a memory access control circuit 66. Request queue 60 is coupled to receive command packets from packet processing logic 58 and is further coupled to coherency control circuit 64 and memory access control circuit 66. Coherency control circuit 64 is coupled to victim record table 62 and is further coupled to packet processing logic 58. Memory access control circuit 66 is further coupled to memory 14A and to packet processing logic 58.

Memory controller 16A receives command packets from packet processing logic 58 into request queue 60. The command packets are routed to memory controller 16A by packet processing logic 58 if the address affected by the command corresponds to a memory location in memory 14A. Memory controller 16A queues the command information in request queue 60, and subsequently processes the command. More particularly, coherency control circuit 64 ensures that the command is performed in a coherent fashion. If probes are required for the command, coherency control circuit 64 transmits a probe indication to packet processing logic 58. For example, the probe indication may include the SrcNode, SrcUnit, and SrcTag from the corresponding command, the address, and the type of command. Packet processing logic 58 may transmit Probe commands in response to the probe indication. Additionally, coherency control circuit 64 may transmit a target done indication for those commands that include a TgtDone packet from the target node. The target done indication may include the SrcNode, SrcUnit, and SrcTag from the corresponding command, and packet processing logic 58 may transmit a TgtDone packet in response to the indication. Coherency control circuit 64 receives SrcDone and MemCancel packets from packet processing logic 58, and may further receive probe responses for WrSized commands (not shown in FIG. 9). Memory access control circuit 66 may interface with memory 14A to perform commands which are committed by coherency control circuit 64 (e.g. after coherency operations have been transmitted and any responses to be received from other nodes have been received). If the command is a read, data may be returned from memory 14A to packet processing logic 58 for forwarding to the source node.

Coherency control circuit 64 may determine if probes are required for a command from the type of command. Additionally, coherency control circuit 64 may inhibit transmission of probes for a first command which may typically require probes (by not transmitting the probe indication to packet processing logic 58 for the first command) if the block affected by the first command is represented in victim record table 62. More particularly, victim record table 62 may comprise a plurality of records. Each record may identify a victim block previously received by memory controller 16A for update into memory 14A. The blocks identified by records in victim record table 62 have been deleted from the cache of the source node that transmitted the victim block, and the block is not cached in any other caches. Since the block is not cached, probes are not needed to ensure coherency. When processing the victim block (received via the VicBlk command in the system embodiment shown above), coherency control circuit 64 allocates a record for the block in victim record table 62. A subsequent command which accesses the block may be processed without transmitting any probes. Additionally, the record corresponding to the block may be invalidated from victim record table 62 in response to the subsequent command. A second subsequent command to the victim block may thus result in probes being transmitted (since the corresponding record in victim record table 62 has been invalidated), and thus coherency may be maintained. Using the victim record table to inhibit probe issuance for the next command to a victim block may reduce the probe traffic in the system, thereby alleviating the bandwidth requirements for probes. Furthermore, latency may be reduced for those commands for which probes are not sent, since the source of those commands may complete the commands without waiting for probe responses.

Additionally, using victim record table 62 to selectively inhibit the use of probes may allow for flexibility in the size of the victim record table. If a particular block is not represented in victim record table 62, probes are performed when the block is accessed (even if the particular block could have been represented in victim record table 62 but is not because of a limited number of records). Thus, coherency is maintained even if every uncached block is not represented in victim record table 62. Accordingly, victim record table 62 may be sized according to cost versus performance tradeoffs (and not according to concerns about correctly maintaining coherency).

In one embodiment, memory controller 16A may further support a CleanVicBlk command that a source node may optionally transmit when deleting a block from the cache which is not modified (and thus need not be written back to memory) and which has not been shared with other caches. Coherency control circuit 64 may allocate a record in victim record table 62 in response to the CleanVicBlk command. Thus, the CleanVicBlk command may allow for further reduction in the probe traffic and/or latency of the system. The CleanVicBlk command may be assigned any suitable command encoding for the embodiment illustrated in FIGS. 1–8.

Victim record table 62 may comprise any suitable structure. For example, victim record table 62 may be a fully associative table in which any entry may be used for any block address. The table may be operated as a FIFO in which the oldest entry is deleted when a new entry is added. Alternatively, the table may be operated as a modified FIFO in which invalid entries are filled before discarding the oldest valid entry. In another alternative, the table may use least recently used (LRU) replacement to replace entries. Other embodiments may use any other replacement algorithm. Victim record table 62 may also be a set associative or direct mapped table in which the victim block address is used as an index to select an eligible entry or entries to store the record.

An exemplary request queue entry 68 is illustrated in FIG. 9 as well. Other embodiments may store additional, less, or alternative information to the information illustrated in FIG. 9. A request queue entry may be allocated to each command received by memory controller 16A. As illustrated in FIG. 9, a request queue entry includes a valid bit (V), a type field (Type) indicating which type of command is received (e.g. command encodings from bit time 1 of the packet may be stored), a SrcNode field storing the source node number identifying the source node of the command, a SrcUnit field storing the source unit number identifying the source unit within the source node, a SrcTag field storing the source tag assigned by the source node, an address field (Addr) storing the address affected by the command, a data field (Data) for storing the data corresponding to the command (for writes and victim blocks), and a state field (State) storing a state of the request. The state field may be used by coherency control circuit 64 and memory access control circuit 66 to track the progress of a command from reception by request queue 60 through various coherency actions initiated by coherency control circuit 64 and performance of the memory operation by memory access control circuit 66. State machines for the VicBlk command and read commands are illustrated below for one embodiment of memory controller 16A.

As mentioned above, coherency control circuit 64 may provide a probe indication to packet processing logic 58 in cases in which probes are required by the command and the block accessed by the command is not recorded in victim record table 62. In the present embodiment, packet processing logic 58 broadcasts Probe commands to each node in computer system 10. However, other systems may be configured differently. Accordingly, one or more probe commands may be transmitted dependent upon the computer system configuration.

The embodiment of memory controller 16A illustrated in FIG. 9 is one embodiment which may be used in the system illustrated in FIGS. 1–8 above or in other similar system configurations. However, the above computer system embodiment is exemplary only, and memory controller 16A as illustrated in FIG. 9 may be used in other system embodiments as well. For example, while the system embodiment illustrated is a distributed memory system, memory controller 16A and particularly victim record table 62 may be used in a shared memory system in which memory 14A is the complete system memory. Furthermore, memory controller 16A and particularly victim record table 62 may be used in embodiments in which a shared bus is used to couple processors to the memory system (possibly through a memory hierarchy). In such a system, bus transactions or signals may be used to transmit commands, probes, etc. Accordingly, while probe and response packets (e.g. SrcDone, TgtDone, and RdResponse) are described as being used in the exemplary embodiment, generally a "message" may be transmitted between coherent components. A "message" may be any form of communication between two components. For example, a message may be a packet (as illustrated in the exemplary embodiment herein), a bus transaction, a dedicated signal or signals between the components, etc.

As used herein, the term "victim block" refers to a block which has been discarded by a cache (e.g. due to replacement in the cache with another block which maps to the same cache storage location or locations). If the victim block has been modified, it is returned to memory to update the copy of the block stored in memory (e.g. using the VicBlk command in the above embodiment). If the victim block has not been modified, an indication of its victimization may or may not be transmitted to other parts of the system (e.g. the optional CleanVicBlk command described above).

Figure 10:
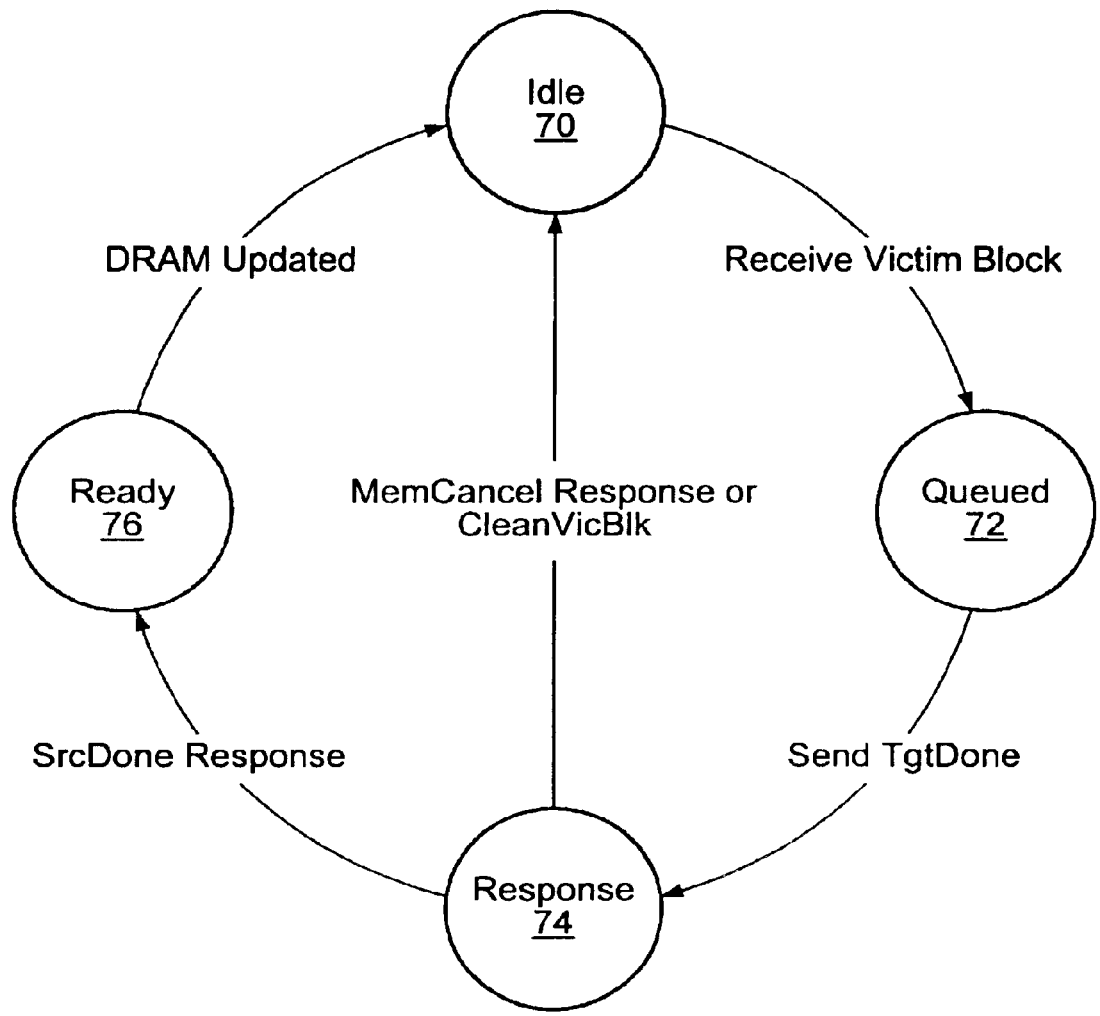
FIG. 10 is a state machine diagram illustrating one embodiment of a state machine employed by one embodiment of the memory controller shown in FIG. 9 for victim blocks.

Turning now to FIG. 10, a state machine diagram of a state machine for the state of a request queue entry is shown according to one embodiment of memory controller 16A. The state machine illustrated in FIG. 10 may be used for VicBlk commands (and CleanVicBlk commands, for embodiments which employ the CleanVicBlk command). Other embodiments are possible and contemplated. The state machine shown in FIG. 10 may include an idle state 70, a queued state 72, a response state 74, and a ready state 76. Various encodings in the state field of the request queue entry may represent the various states.

Figure 11:
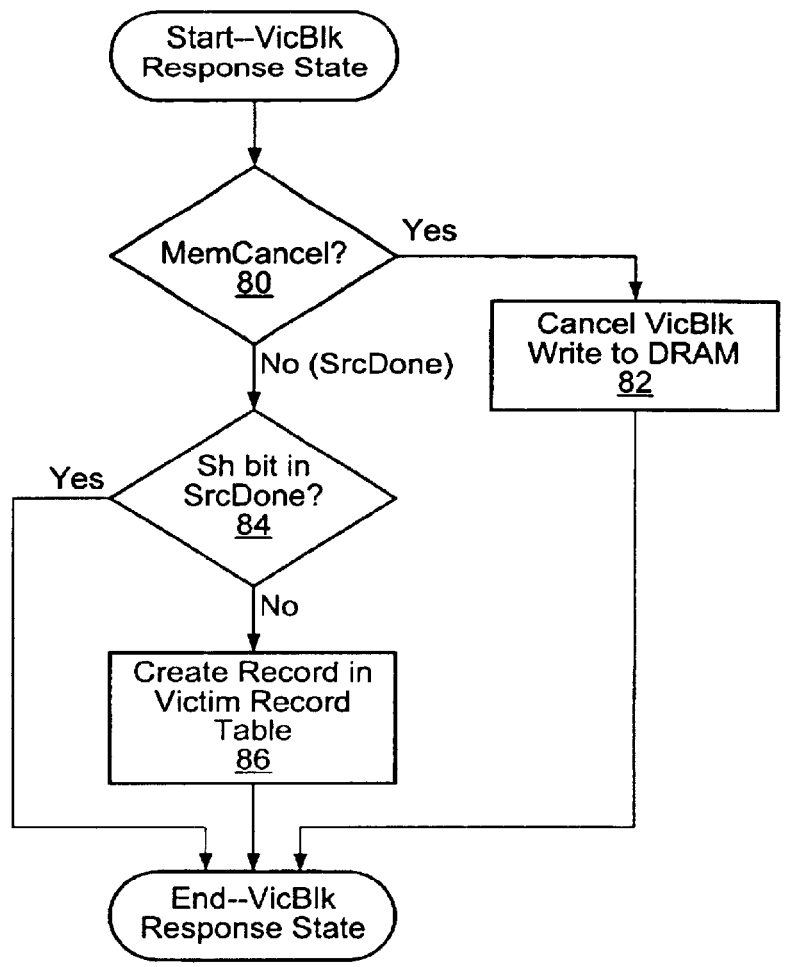
FIG. 11 is a flowchart of operations performed by one embodiment of the coherency control circuit shown in FIG. 9 during the response state of a victim block.

Idle state 70 may correspond to the request queue entry being invalid. A transition from idle state 70 to queued state 72 is performed when a VicBlk or CleanVicBlk command is received and queued in the request queue entry. The request queue entry remains in queued state 72 until the request queue entry is selected by coherency control circuit 64 for processing. Coherency control circuit 64 transmits a Tgt-Done packet to the source of the command and the state machine transitions to response state 74. The state machine remains in response state 74 until a response is received for the command (determined by the source node, source unit, and source tag matching the command's source node, source unit, and source tag). Additional details regarding operation of coherency control circuit 64 for a VicBlk or CleanVicBlk command in response state 74 are shown in FIG. 11 below. If the response is a MemCancel response, or if the command is the CleanVicBlk command, the state machine returns to idle state 70. On the other hand, if the command is the VicBlk command and the response is the SrcDone response, the state machine transitions to ready state 76. Memory access control circuit 66 may determine that the victim block is committed for update into memory 14A when the state machine reaches ready state 76. Once memory access control circuit 66 updates the memory with the victim block, the state machine returns to idle state 70.

Turning next to FIG. 11, a flowchart is shown illustrating operation of one embodiment of coherency control circuit 64 during the response state 74 of a victim block command when a response packet for the victim block command (e.g. a VicBlk or CleanVicBlk command, in one embodiment) is received. The response packet may be associated with the victim block command by comparing the source node, source unit, and source tag information from the MemCancel response packet with the source node, source unit, and source tag information in the request queue entry storing the victim block command. Other embodiments are possible and contemplated. The operations shown in FIG. 11 are illustrated in a particular order for ease of understanding. However, any suitable order may be used. Furthermore, operations may be performed in parallel by combinatorial logic circuitry within coherency control circuit 64.

Coherency control circuit 64 determines if a MemCancel response packet is received for the command (decision block 80). If a MemCancel response packet is received for the command, the VicBlk command's update to memory is cancelled (operation 82). Additionally, no record is allocated for the victim block in victim record table 62 in this case. The victim block may be cancelled because an intervening probe (received by the source node subsequent to transmitting the victim block command and prior to memory controller 16A completing the victim block command) invalidated the victim block. Accordingly, the victim block may be cached in another cache and thus allocating a record in victim record table 62 may create incoherency.

If the response packet is not a MemCancel response packet, then it is a SrcDone response packet. Coherency control circuit 64 examines the SrcDone response packet to determine whether or not the victim block was shared with another cache (decision block 84). A victim block may be shared with another cache without invalidating the victim block (for example, if a read is performed by another cache to the victim block). In one embodiment, the SrcDone response packet may include a shared bit (Sh) which, when set, indicates that the victim block was shared with another cache. If the shared bit is clear, the victim block was not shared with another cache. The determination of whether or not the victim block was shared with another cache (without invalidating the victim block) may not cancel the victim block's update into the memory (since the update is still valid) but may prevent coherency control circuit 64 from allocating a record in victim record table 62 (since the victim block is still cached in another cache). It is noted that, depending on the coherency scheme employed by the computer system, it may or may not be possible for the victim block to have been shared and thus the shared indication may or may not be used in various embodiments.

If the SrcDone response packet indicates that the victim block was shared, then no record is allocated in victim record table 62 for the victim block. On the other hand, if the SrcDone packet indicates that the victim block was not shared, then a record is created in victim record table 62 (operation 86).

Figure 12:
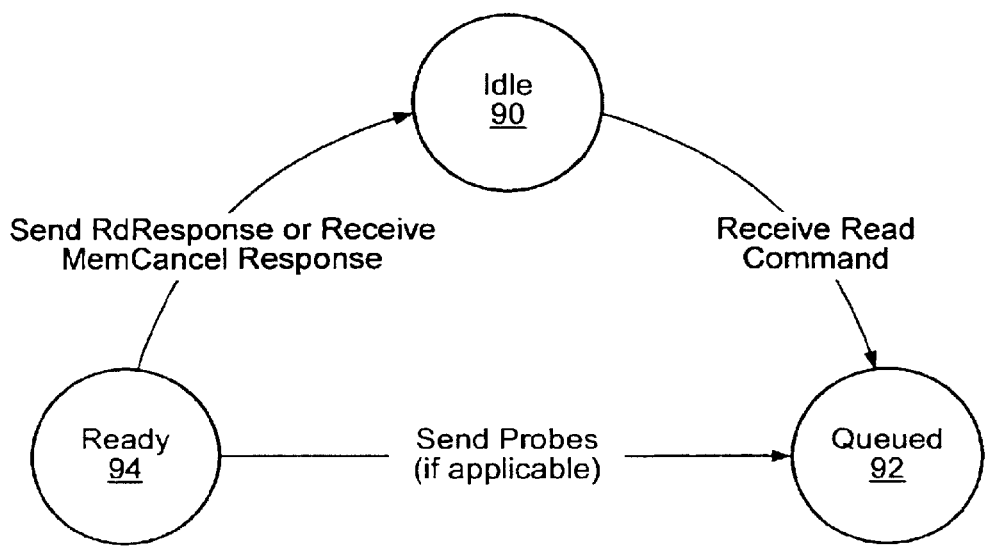
FIG. 12 is a state machine diagram illustrating one embodiment of a state machine employed by one embodiment of the memory controller shown in FIG. 9 for read commands.

Turning now to FIG. 12, a state machine diagram of a state machine for the state of a request queue entry is shown according to one embodiment of memory controller 16A. The state machine illustrated in FIG. 12 may be used for read commands (e.g. a RdBlk, RdBlkS, RdBlkMod, or Read-Sized commands). Other embodiments are possible and contemplated. The state machine shown in FIG. 12 may include an idle state 90, a queued state 92, and a ready state 94. Various encodings in the state field of the request queue entry may represent the various states.

Figure 13:
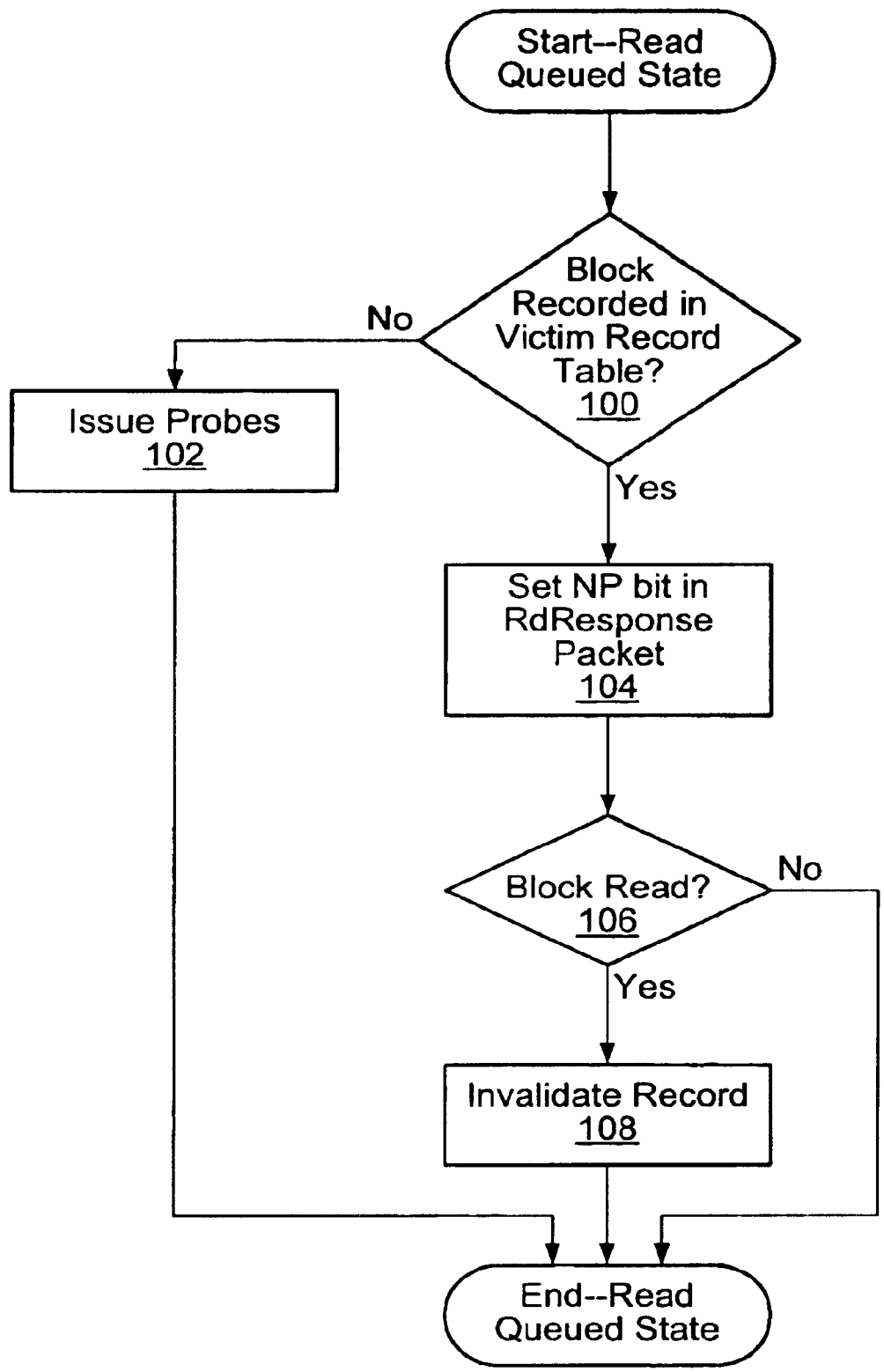
FIG. 13 is a flowchart of operations performed by one embodiment of the coherency control circuit shown in FIG. 9 during the queued state of a read command.

Idle state 90 may correspond to the request queue entry being invalid. A transition from idle state 90 to queued state 92 is performed when a read command is received and queued in the request queue entry. The request queue entry remains in queued state 92 until the request queue entry is selected by coherency control circuit 64 for processing. Additional details regarding operation of coherency control circuit 64 for a read command in queued state 92 are shown in FIG. 13 below. Generally, coherency control circuit 64 determines if probes are to be issued for the read command and provides a probe indication to packet processing logic 58 if probes are to be issued. Additionally, the state machine transitions to ready state 94. Memory access control circuit 66 may access the memory 14A for the read command responsive to the state machine reaching the ready state. The RdResponse packet may be transmitted along with the data read from the corresponding memory block, and the state machine may transition to idle state 90. Additionally, if a MemCancel response packet is received from a probed node for the read command prior to transmitting the RdResponse packet, the state machine may transition to idle state 90 without transmitting the RdResponse packet.

Turning now to FIG. 13, a flowchart is shown illustrating operation of one embodiment of coherency control circuit 64 during the queued state 92 of a read command in a request queue entry. Other embodiments are possible and contemplated.

The operations shown in FIG. 13 are illustrated in a particular order for ease of understanding. However, any suitable order may be used. Furthermore, operations may be performed in parallel by combinatorial logic circuitry within coherency control circuit 64.

Coherency control circuit 64 accesses victim record table 62 to determine if the block accessed by the read is identified by a record in victim record table 62 (decision block 100). If the block is not identified by a record in the victim record table 62, then coherency control circuit 64 may issue probes for the read command (operation 102). If the block is identified by a record in the victim record table 62, coherency control circuit 64 may inhibit issuance of probes for the read command. Additionally, in the present embodiment, probe responses for read commands are returned to the source node.

Accordingly, memory controller 16A may indicate to the source node in the RdResponse packet that no probe responses will occur for this read command (operation 104). For example, the RdResponse packet may include an NP ("no probe response") bit which indicates, when set, that no probe responses will occur for this read command and which indicates, when clear, that probe responses will occur for this read command. The setting of the NP bit in the RdResponse packet may actually occur during a later state, but coherency control circuit 64 may store an indication that probes were inhibited (e.g. in the request queue entry) to allow the NP bit to be set when the RdResponse packet is generated.

Coherency control circuit 64 may determine if the read command is a block read command (decision block 106). For example, in the embodiment illustrated in FIGS. 1–8, the RdBlk, RdBlKS, and RdBlkMod commands are block read commands and the ReadSized command is not a block read command. Generally, a read command is a block read command if the read accesses a block of data (for caching) and is not a block read command if the read accesses less than a block of data (and thus does not cache the data). If the read command is not a block read command, then there is no caching of the block and thus the record in victim record table 62 may remain valid. If the read command is a block read command, coherency control circuit 64 may invalidate the record identifying the block in victim record table 62 (operation 108). Not invalidating the record is an optimization, and coherency control circuit 64 may alternatively invalidate the record when a read command to the corresponding block occurs.

It is noted that, in the embodiment illustrated in FIGS. 1–8, a ValidateBlk command is also supported which allows the source to validate a block in its cache without reading the block from memory. Coherency control circuit 64 may similarly inhibit probes with respect to the ValidateBlk command if the affected block is identified by a record in victim record table 62 (and may further invalidate the record). The TgtDone response packet for the ValidateBlk command may include an indication (similar to the NP bit in the RdResponse packet) which indicates to the source of the ValidateBlk command that no probe responses will be received if probes are inhibited for the ValidateBlk command. The ChangetoDirty command may also be handled in a similar fashion, if desired.

Turning now to FIG. 14, a block diagram of an exemplary entry 110 which may be employed by one embodiment of victim record table 62 is shown. Other embodiments are possible and contemplated. In the embodiment of FIG. 14, entry 110 includes a valid bit (V), a page address field (Page Address), and a plurality of block valid bits (B0V, B1V, B2V, B3V, through B63V).

Entry 110 may comprise multiple records, each of the records within the entry identifying blocks within the same page. Each block valid bit corresponds to a block within the page, with the B0V bit corresponding to the first block within the page (stored at the lowest block address within the page), the B1V bit corresponding to the second block within the page (stored at the second lowest block address within the page), etc. up through the B63V bit corresponding to the last block within the page (stored at the largest block address within the page). Each record is indicated as valid or invalid via a corresponding block valid bit, and the entry is indicated as valid via the valid bit. The page address field stores the page portion of the address of the blocks represented by entry 110. Accordingly, a record may comprise the page address field, the corresponding block valid bit, and the valid bit. The storage for the page address field and the valid bit is shared for all the records within the page, and thus the amount of storage used may be less than if each record were accorded its own entry with an address field and a valid bit. An embodiment of victim record table 62 employing entries of the form of entry 110 may leverage the locality of cache reference that may exist in a program, whereby if one block in a page is cached (and later made a victim), other blocks in the page may be cached as well (and may later be made a victim). Programs which exhibit locality of cache reference may efficiently use the entries 110.

Coherency control unit 64 may allocate a record for a victim block by first comparing the page portion of the address of the victim block to the page address field of the entries in victim record table 62. If a match on the page portion of the address is detected in a valid entry (V bit set), then the block address within the page of the victim block is decoded to select a block valid bit within that entry. The selected block valid bit is set. On the other hand, if a match on the page portion of the address is not detected in a valid entry, an entry is selected for the victim block according to any suitable replacement algorithm. The page portion of the address is stored in the page address field and the valid bit (V is set). Additionally, the block valid bit corresponding to the victim block (as described above) is set.

Coherency control unit 64 may search for a record corresponding to a block accessed by a read command in a similar fashion: by comparing the page portion of the address of the block accessed by the read command to the page address field of the entries, and decoding the block address within the page to select a block valid bit. If a match is detected on a valid entry and the selected block valid bit is set, a record identifying the block accessed by the read command exists in victim record table 62. Otherwise, a record identifying the block accessed by the read command does not exist in victim record table 62.

The entry 110 illustrated in FIG. 14 may include 64 block valid bits (for a 4 kilobyte page size and a 64 byte block size). Other embodiments may include different numbers of block valid bits per entry dependent upon the page size and the block size (both of which may be varied according to design choice).

Other embodiments of entries are contemplated as well. For example, an embodiment in which each entry corresponds to one record (e.g. with a valid bit and block address including page portion). Generally, an "entry" in victim record table 62 is the unit of allocation of space in the victim record table. An entry may correspond to one or more records. A record is the information which identifies one block within the victim record table.

Turning next to FIG. 15, a block diagram is shown of one embodiment of a SrcDone packet 120 which may be used by a source node to indicate that a VicBlk command is done and to indicate whether or not the victim block has been shared with another cache. Other embodiments are possible and contemplated. In the embodiment of FIG. 15, SrcDone packet 120 includes command, source unit, source node, destination unit, destination node, and source tag fields in bit times 1, 2, and 3 similar to FIGS. 3–5. Additionally, SrcDone packet 120 may include a shared bit (Sh—reference numeral 122). The shared bit may be used to indicate, when associated with a VicBlk or CleanVicBlk command, whether or not the block was shared with another node (as described above).

Turning now to FIG. 16, a block diagram is shown of one embodiment of a RdResponse packet 130 which may be used to indicate to the source node of a read command that no probe responses will occur for the read command. Other embodiments are possible and contemplated. In the embodiment of FIG. 16, RdResponse packet 130 includes command, source unit, source node, destination unit, destination node, and source tag fields in bit times 1, 2, and 3 similar to FIGS. 3–5. Additionally, RdResponse packet 130 includes an error bit (Err), a count field (Count[3:0]), a cancel bit (Cncl), a no probes bit (reference numeral 132), a probe bit (P) and a shared bit (Sh). The error bit may be set to indicate an error has occurred. The count field is used for ReadSized commands to indicate the number of bytes provided, and may be set to 0xF for block read responses. The cancel bit may be used by a probed node to indicate that a MemCancel packet was sent to the memory controller for the read command. The probe bit may be set to indicate the RdResponse packet 130 is from a probed node, and may be cleared to indicate that the RdResponse packet 130 is from the memory controller. The shared bit may indicate that the source should cache the block in the shared state.

No probes bit 132 may be used to indicate to the source node whether or not probe responses may occur for the read command (as described above). If NP bit 132 is set, no probe responses will occur. If NP bit 132 is clear, probe responses will be received and the source node may await the probe responses before committing the read command.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a table configured to store a plurality of records, wherein a first record of said plurality of records is configured to identify a first block previously received as a victim block by a memory controller; and
   a control circuit coupled to said table, wherein said control circuit is configured to inhibit issuance of one or more probes for a first read command responsive to said first read command accessing said first block;
   wherein said control circuit is configured to selectively allocate a second record of said plurality of records to a second block during processing of said second block as a victim block by said memory controller; and
   wherein said control circuit is further configured to process said second block by transmitting a first message to a source of said second block and receiving a second message from said source in response to said first message, and wherein said second message includes an indication of whether or not said second block was shared by said source.

2. The apparatus as recited in claim 1 wherein said control circuit is configured to allocate said second record responsive to said indication indicating that said second block was not shared by said source.

3. The apparatus as recited in claim 1 wherein said control circuit is configured not to allocate said second record responsive to said indication indicating that said second block was shared by said source.

4. An apparatus comprising:
   a table configured to store a plurality of records, wherein a first record of said plurality of records is configured to identify a first block previously received as a victim block by a memory controller; and
   a control circuit coupled to said table, wherein said control circuit is configured to inhibit issuance of one or more probes for a first read command responsive to said first read command accessing said first block;
   wherein said control circuit is configured to selectively allocate a second record of said plurality of records to a second block during processing of said second block as a victim block by said memory controller; and
   wherein said control circuit is further configured to process said second block by transmitting a first message to a source of said second block and receiving a second message from said source in response to said first message, and wherein said second message indicates that said second block is invalid, and wherein said control circuit is configured not to allocate said second record responsive to said second message.

5. The apparatus as recited in claim 4 wherein said control circuit is configured to allocate a second record of said plurality of records to a second block responsive to receiving a first message from a source, said first message indicating that said second block is being discarded by said source but is not modified by said source.

6. An apparatus comprising:
   a table configured to store a plurality of records, wherein a first record of said plurality of records is configured to identify a first block previously received as a victim block by a memory controller; and
   a control circuit coupled to said table, wherein said control circuit is configured to inhibit issuance of one or more probes for a first read command responsive to said first read command accessing said first block;
   wherein said table comprises a plurality of entries, wherein a first entry of said plurality of entries corresponds to at least two of said plurality of records;
   wherein each of said at least two of said plurality of records identify blocks within a first page; and
   wherein said first entry includes a first address of said first page and a plurality of indications, each of said plurality of indications corresponding to a respective one of said at least two of said plurality of records and indicative of a validity of said respective one of said at least two of said plurality of records.

7. A computer system comprising:
   a memory;
   a memory controller coupled to said memory, said memory controller including a table configured to store a plurality of records, wherein a first record of said plurality of records is configured to identify a first block previously received by said memory controller as a victim block; and
   a source coupled to said memory controller, wherein said source is configured to transmit a first read command to said memory controller, and wherein said memory controller is configured to inhibit issuance of one or more probes for said first read command responsive to said first read command accessing said first block;
   wherein said source is configured to transmit a second victim block to said memory controller, and wherein said memory controller is configured to selectively allocate a second record of said plurality of records to said second victim block during processing of said second victim block;
   wherein said memory controller is configured to process said second victim block by transmitting a first message to said source and receiving a second message from said source in response to said first message, and wherein said memory controller is configured to selectively allocate said second record responsive to said second message.

8. The computer system as recited in claim 7 wherein said second message includes an indication of whether or not said second victim block was shared by said source, and wherein said memory controller is configured to allocate said second record responsive to said indication indicating that said second victim block was not shared by said source.

9. The computer system as recited in claim 8 wherein said memory controller is configured not to allocate said second record responsive to said indication indicating that said second victim block was shared by said source.

10. The computer system as recited in claim 7 wherein said memory controller is configured not to allocate said second record responsive to said second message indicating that said second victim block is invalid.

11. The computer system as recited in claim 7 wherein said memory controller is configured to transmit a read response message to said source responsive to said first read command, and wherein said read response message includes an indication that probes were inhibited for said first read command.

12. The computer system as recited in claim 7 further comprising a plurality of nodes, wherein said memory controller is included within one of said plurality of nodes, and wherein said source is included in one of said plurality of nodes.

13. The computer system as recited in claim 12 wherein another one of said plurality of nodes includes a memory controller coupled to a memory, said memory controller including a table configured to store a plurality of records, wherein a first record of said plurality of records is configured to identify a first victim block previously received by said memory controller.

14. The computer system as recited in claim 13 wherein each of said plurality of nodes includes said memory controller coupled to a memory.

* * * * *